Patented May 23, 1950

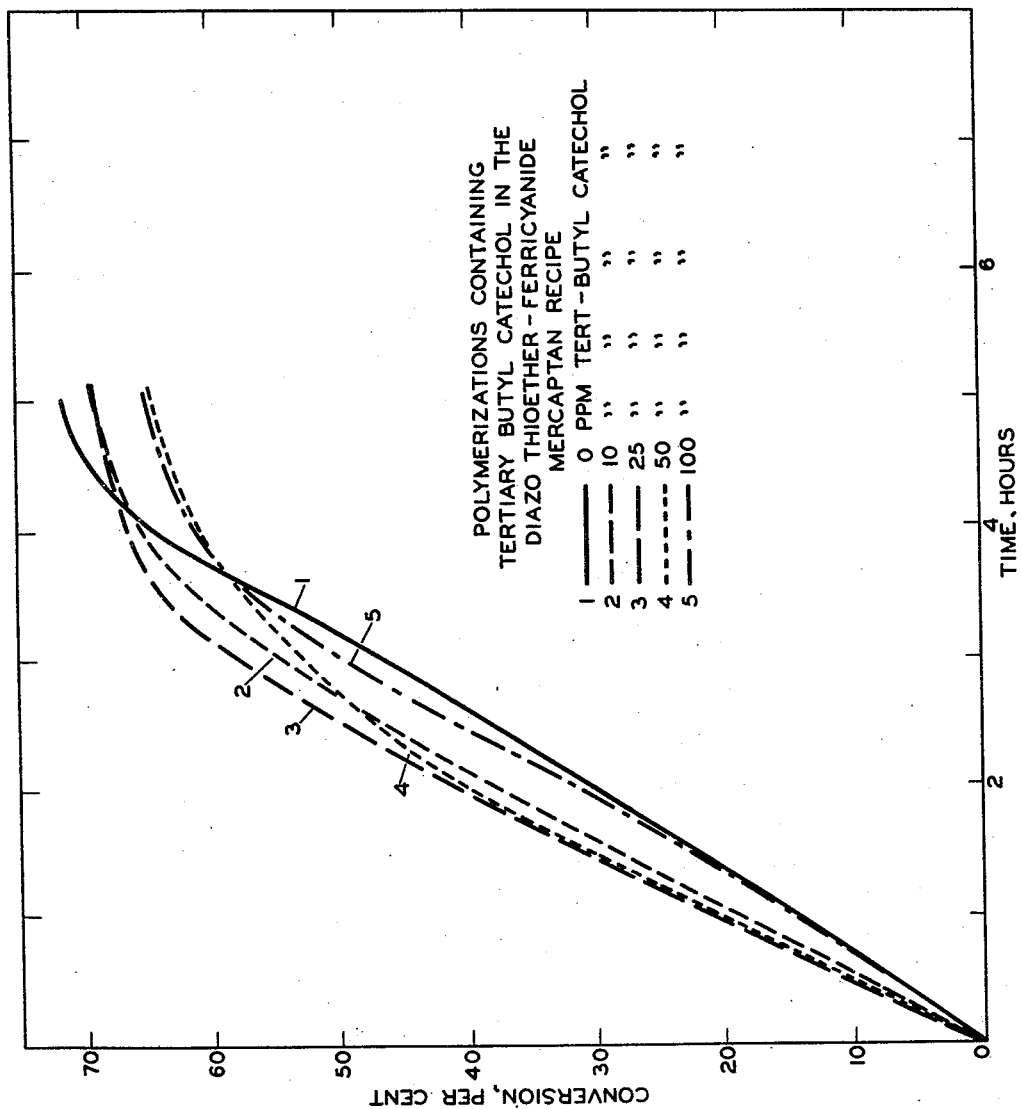

2,508,734

UNITED STATES PATENT OFFICE 2,508,734

EMULSION POLYMERIZATION WITH A COMPOSITION COMPRISING DIAZO THIOETHER - FERRICYANIDE - MERCAPTAN-DIHYDROXY AROMATIC COMPOUND

James E. Troyan, Phillips, Tex., assignor to Phillips Petroleum Company, a corporation of Delaware Application May 19, 1947, Serial No. 749,064

14 Claims. (Cl. 260—84.1)

This invention relates to the polymerization of unsaturated organic compounds capable of undergoing an addition polymerization to form high molecular weight polymers. In one of its more specific aspects it relates to the polymerization of an aliphatic conjugated diene hydrocarbon, including substituted derivatives, either alone or in admixture with a monomer copolymerizable therewith, to form long chain polymers of the type known as synthetic rubbers. In a still more specific aspect it relates to the polymerization of a butadiene-1,3 hydrocarbon and a monomer copolymerizable therewith in an aqueous dispersion.

A specific embodiment of this invention relates to the use of dihydroxy aromatic compounds as activators in emulsion polymerization systems wherein diazo thioether-ferricyanide-mercaptan recipes are employed. In a more specific embodiment, it relates to a method whereby improved monomer conversion rates are effected in diazo thioether-ferricyanide-mercaptan systems by the addition of a dihydroxy benzene, or a monosubstituted alkyl or cycloalkyl derivative thereof, to the polymerization recipe.

It is well known that dihydroxy benzenes, alkyl homologues of dihydroxy benzenes, and similar substances are generally employed as stabilizing agents for diolefins to prevent polymerization during transportation and storage. Since these materials are known to inhibit polymerization it has generally been considered necessary that they be completely removed before the diolefins are used in polymerization reactions. Any purification step to effect complete removal of these dihydroxy compounds is both expensive and time consuming.

I have now found a method whereby polymerization reactions can be carried out effectively and increased reaction rates obtained by operating in the presence of small amounts of compounds selected from the group consisting of dihydroxy aromatic compounds and certain substituted alkyl, aryl, aralkyl, and cycloalkyl derivatives. The method comprises the addition of a small quantity of the selected dihydroxy compound to a polymerization recipe wherein diazo thioether - ferricyanide - mercaptan compositions are employed as initiator-modifiers, said additive agent being admixed with the reactants prior to starting the polymerization. The presence of these additive materials produces a pronounced acceleration in polymerization rate, a fact which is wholly unexpected since compounds of this class are regarded as polymerization inhibitors.

The monomeric material polymerized to produce polymers by the process of this invention comprises unsaturated organic compounds which generally contain the characteristic structure $CH_2=C<$ and, in most cases, have at least one of the disconnected valencies attached to an electronegative group, that is, a group which increases the polar character of the molecule such as a chlorine group or an organic group containing a double or triple bond such as vinyl, phenyl, nitrile, carboxy or the like. Included in this class of monomers are the conjugated butadienes or 1,3-butadienes such as butadiene (1,3-butadiene), 2,3-dimethyl-1,3-butadiene, isoprene, piperylene, 3-furyl-1,3-butadiene, 3 - methoxy-1,3-butadiene and the like; haloprenes, such as chloroprene, (2 - chloro-1,3-butadiene) bromoprene, methyl chloroprene (2-chloro-3-methyl-1,3-butadiene), and the like; aryl olefins such as styrene, various alkyl styrenes, p-chloro styrene, p-methoxy styrene, alpha-methyl styrene, vinyl naphthalene and similar derivatives thereof, and the like; acrylic and substituted acrylic acids and their esters, nitriles and amides such as acrylic acid, methacrylic acid, methyl acrylate, ethyl acrylate, methyl alpha-chloroacrylate, methyl methacrylate, ethyl methacrylate, butyl methacrylate, methyl ethacrylate, acrylonitrile, methacrylonitrile, methacrylamide and the like; methyl isopropenyl ketone, methyl vinyl ketone, methyl vinyl ether, vinylethinyl alkyl carbinols, vinyl acetate, vinyl chloride, vinylidene chloride, vinyl furane, vinyl carbazole, vinyl acetylene and other unsaturated hydrocarbons, esters, alcohols, acids, ethers, etc., of the types described. Such unsaturated compounds may be polymerized alone, in which case simple linear polymers are formed, or mixtures of two or more of such compounds which are copolymerizable with each other in aqueous emulsion may be polymerized to form linear copolymers.

The process of this invention is particularly effective when the monomeric material polymerized is a polymerizable aliphatic conjugated diolefin or a mixture of such a conjugated diolefin with lesser amounts of one or more other compounds containing an active $CH_2=C<$ group which are copolymerizable therewith such as aryl olefins, acrylic and substituted acrylic acids, esters, nitriles and amides, methyl isopropenyl ketone, vinyl chloride and similar compounds mentioned hereinabove. In this case the products of the polymerization are high molecular weight linear polymers and copolymers which are rubbery in character and may be called synthetic rubber. Although, as can be readily deduced from the foregoing, there is a host of possible reactants, the most readily and commercially available monomers at present are butadiene itself (1,3-butadiene) and styrene. The invention will, therefore, be more particularly discussed and exemplified with reference to these typical reactants.

One object of this invention is to polymerize unsaturated organic compounds.

Another object of this invention is to produce an improved synthetic rubber.

A further object of this invention is to produce a synthetic rubber by polymerization of monomeric material in aqueous emulsion at temperatures lower than ordinarily used.

Still another object of this invention is to increase the reaction rate in polymerizing unsaturated organic compounds in aqueous emulsion.

An additional object of this invention is to provide a process wherein a dihydroxy aromatic compound may be used to advantage.

A further object of this invention is to use a dihydroxy benzene in an emulsion polymerization of a diolefin.

Other objects and advantages of this invention will become apparent, to one skilled in the art, from the accompanying disclosure and discussion.

The accelerating agents used in the practice of this invention belong to a class of compounds which may be represented by the formula $$R_2Ar(OH)_2$$

where Ar is an aromatic nucleus, preferably of the group consisting of benzene and naphthalene nuclei, each R is a radical of the group consisting of hydrogen, alkyl, cycloalkyl, aryl and aralkyl, each having not more than seven carbon atoms with the sum of the carbon atoms in $R_2$ being not greater than seven, and with both OH directly attached to the same aromatic ring and in ortho or para relationship to each other. It is preferred to use compounds wherein Ar is a benzene nucleus, and at least one R is hydrogen. Such preferred compounds, hereinafter referred to as dihydroxy benzenes, include catechol and hydroquinone and their monosubstituted alkyl and cycloalkyl derivatives.

In addition to the accelerating action produced by the dihydroxy aromatic compounds herein described, there are other advantages to be gained when operating according to the process of this invention. While in general, it is necessary to effect complete removal of the inhibitor usually present in the diolefin before carrying out a polymerization reaction, such an operation is not necessary in connection with the practice of this invention. Thus, greater economy of operation, both from the standpoint of equipment costs and time consumed, is achieved than by methods heretofore employed. Removal of the inhibitor need be only partially complete, if effected at all, the amount remaining being sufficient to produce an accelerating action in the diazo thioether-ferricyanide-mercaptan recipes employed. Of course, if such a material is not initially present, the desired amount may be added.

When operating according to the process of this invention a diolefin, such as butadiene, is copolymerized with an unsaturated organic compound, preferably a vinyl compound, such as styrene, in the presence of a small quantity of a dihydroxy aromatic compound. The polymerization is effected in water emulsion in the presence of an emulsifying agent such as a fatty acid soap, rosin soap, a mixture of fatty acid soap with rosin soap, or any other emulsifying agent known to produce satisfactory results in polymerization reactions of this type. Other materials present in the polymerization recipe include the following: a suitable modifier such as a primary, secondary, or tertiary mercaptan or blends of various mercaptans; a diazo thioether; and a ferricyanide such as sodium or potassium ferricyanide. In some instances alkaline-reacting materials such as trisodium phosphate, sodium hydroxide, and similar substances are added to increase polymerization rates at low temperatures. The polymerization is carried out according to conventional procedures until the conversion reaches about 60 to 65 per cent. Treatment of the latex is subsequently effected in the usual manner, as by the addition of a shortstopping agent and an antioxidant followed by coagulation and drying of the product.

The diazo thioethers employed in the initiator-modifier compositions have the general structural formula R—N=N—S—R' wherein R is a member of the group consisting of aromatic and substituted aromatic radicals and R' is a member of the group consisting of aromatic, substituted aromatic, cycloalkyl, substituted cycloalkyl, aliphatic, and substituted aliphatic radicals. The diazo thioethers preferred for use as polymerization catalysts in accordance with the present invention are those in which both R and R' in the foregoing structural formula are aromatic or substituted aromatic groups. Examples of preferred compounds are substituted phenyl diazo thio-(napthyl) ethers, phenyl diazo thio-(phenyl) ethers, naphthyl diazo thio-(phenyl) ethers, and naphthyl diazo thio-(naphthyl) ethers. Preferred substituent groups are the alkyl, alkoxy, aryloxy (e. g., phenoxy), carboxy, sulfo ($SO_3H$), halo, and nitro groups. Other substituents give diazo thio-ethers of varying degrees of usefulness. Among preferred compounds are those more fully described in an application of Reynolds and Cotton, Serial No. 641,866, filed January 17, 1946 now U. S. Patent 2,501,692, and are those represented by the formula

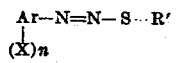

where Ar is an aryl group and X is a substituent selected from the group consisting of alkyl, alkoxy, aryl and aryloxy radicals; and R' is a member of the group consisting of aromatic, substituted aromatic, cycloalkyl, substituted cycloalkyl, aliphatic, and substituted aliphatic radicals. Specific examples are the following: p-methoxy phenyl diazo thio-(2-naphthyl) ether, dimethyl phenyl diazo thio-(2-naphthyl) ether, dimethyl phenyl diazo thio-(p-methoxy phenyl) ether, p-methoxy phenyl diazo thio-(o-carboxy phenyl) ether, p-sulfo phenyl diazo thio-(2-naphthyl) ether, p-sulfo phenyl diazo thio-(p-tolyl) ether, 2-naphthyl diazo thio-(carboxy phenyl) ether, and the like, together with the ammonium and alkali metal salts of such compounds. Some of the more important compounds may be conveniently represented by the formula

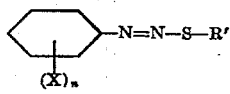

where X is a substituent selected from the group consisting of alkoxy and aryloxy radicals, n is an integer from one to four, and R' is a member of the group consisting of aromatic, substituted aromatic, cycloalkyl, substituted cycloalkyl, aliphatic, and substituted aliphatic radicals.

The total amount of diazo thioether used in the present process will generally range from about 0.05 to about 1.0 part per 100 parts monomers with about 0.10 to about 0.50 part being most frequently preferred. The amount is governed by the operating temperature and the quantities of the other catalytic materials present.

The ferricyanides which are applicable are those of the alkali metals, including ammonium. However, potassium ferricyanide is most generally preferred. The amount of ferricyanide employed may vary from about 0.03 to about 1 part per 100 parts monomers but the preferred amount usually ranges from about 0.25 to about 0.35 part. The amount of this and other catalyst constituents in any particular case will, of course, be somewhat dependent upon the amounts of other constituents, and optimum amounts can be readily determined by one skilled in the art.

The mercaptans which may be employed comprise those of primary, secondary, and tertiary configuration containing from four to twenty carbon atoms per molecule with those containing from six to about sixteen carbon atoms per molecule being most generally preferred. While tertiary mercaptans are most widely used and in many cases are most desirable, primary and secondary mercaptans are sometimes advantageous. It is also frequently preferred to employ blends of mercaptans such as, for example, blends of tertiary $C_{12}$, $C_{14}$, and $C_{16}$ mercaptans.

The quantity of mercaptan employed will vary depending upon the molecular weight and purity of the material as well as upon the results desired. For example, when tertiary $C_{12}$ mercaptan is used, the amount generally varies within the range of about 0.05 to about 1.40 parts per 100 parts of monomers charged, with the narrower range of about 0.10 to about 0.45 part being most frequently preferred.

When operating according to the method of this invention temperatures may range from about −30 to about 70° C. with temperatures from about −10 to about 20° C. usually preferred. Obviously when polymerizations are carried out in aqueous emulsion in the absence of freezing point depressants, temperatures below the freezing point of water cannot be employed. The use of various additive agents, however, makes a process of the type disclosed herein applicable at lower temperatures, and, in fact, this is one of the distinct advantages of the present invention. An example of such a low temperature system is a glycerin-water solution, and the term "aqueous emulsion" should be construed to include the use of an aqueous medium comprising water and a sufficient amount of a water-soluble component, preferably organic, to lower the freezing point below the desired polymerization temperature, whether or not the actual polymerization temperature is above or below 0° C. It is generally preferred that the emulsion be of an "oil in water" type, with the ratio of aqueous medium to monomeric material between about 1.5:1 and about 2.75:1, in parts by weight. At low ratios the emulsions tend to have high viscosities and at high ratios the yield per unit volume of reactor per unit of time is low. In the practice of the invention suitable means will be necessary to establish and maintain an emulsion and to remove reaction heat to maintain a desired reaction temperature. The polymerization may be conducted in batches, semicontinuously, or continuously. The total pressure on the reactants is preferably at least as great as the total vapor pressure of the mixture, so that the initial reactants will be present in liquid phase.

The amount of dihydroxy aromatic compound employed as an accelerator in this invention will vary depending upon such factors as the polymerization temperature, ratio of ferricyanide to diazo thioether, amount of water used in the polymerization recipe, and the like. The amount of additive agent may range as high as about 100 parts per million, based on the monomeric material charged, with about 10 to about 75 parts per million being most generally preferred.

Advantages of this invention are illustrated by the following examples. The reactants, and their proportions, and the other specific ingredients of the recipes are presented as being typical and should not be construed to limit the invention unduly.

*Example I*

A series of butadiene-styrene copolymerization reactions was carried out in which tertiary butyl catechol in amounts of 10, 25, 50 and 100 parts per million (based on the butadiene) was charged to the reactor. A control run was also made which contained none of the additive agent. The following recipe was employed:

| | Parts by weight |
|---|---|
| Butadiene | 70 |
| Styrene | 30 |
| Water | 250 |
| Rosin soap, pH=10.3 | 5.0 |
| Tertiary mercaptan blend[1] | 0.4 |
| 2-(p-methoxybenzene diazo mercapto)-napthalene | 0.3 |
| Potassium ferricyanide | 0.3 |
| Trisodium phosphate ($Na_3PO_4 \cdot 12H_2O$) | 0.5 |

[1] A blend of mixed teritary mercaptans comprising $C_{12}$, $C_{14}$, and $C_{16}$ mercaptans in a ratio of 3:1:1 parts by weight.

For the control run the rosin soap, potassium ferricyanide, and water were charged to the reactor followed by the styrene in which the mercaptan blend was dissolved. Butadiene was then introduced and polymerization carried out in the conventional manner at a temperature of 5° C. for a period of four hours. In the runs wherein tertiary butyl catechol was employed as an accelerator, it was blended with a portion of the styrene and the mixture charged to the reactor followed by the remainder of the styrene in which the mercaptan was dissolved. Polymerizations containing the accelerator were carried out in the same manner as the control using a four-hour reaction period while maintaining the temperature level at 5° C. The time-conversion data are shown in the accompanying figure.

*Example II*

A sample of butadiene containing 20 parts per million tertiary butyl catechol was copolymerized with styrene using the recipe of Example I. The soap, ferricyanide, and water were charged to the reactor followed by the styrene-mercaptan solution. The butadiene containing the tertiary butyl catechol was then introduced and polymerization effected at a temperature of 5° C. until a 60 per cent conversion was reached. A parallel run was made in which no tertiary butyl catechol was present and a 51 per cent conversion obtained when the same reaction period was used.

Similar runs were carried out in which hydroquinone and methyl hydroquinone (2-methyl- 1,4-dihydroxy benzene), respectively, were employed as accelerators. Results comparable to those given in Examples I and II were obtained.

As will be evident to those skilled in the art, various modifications of this invention can be made, or followed, in the light of the foregoing disclosure and discussion, without departing from the spirit or scope of the disclosure or from the scope of the claims.

I claim:

1. In the production of synthetic rubber by the polymerization of a monomeric material comprising a major amount of 1,3-butadiene and a minor amount of styrene in an aqueous emulsion, the improvement which comprises effecting said polymerization in the presence of a composition comprising a dihydroxy benzene in an amount between about 10 and about 100 parts per million parts of said monomeric material together with about 0.05 to about 1 part of a diazo thioether having the structural formula $$R-N=N-S-R'$$

where R is an aromatic radical and R' is selected from the group consisting of aromatic, cycloalkyl, and aliphatic radicals, about 0.03 to about 1 part of a ferricyanide, and between about 0.05 and about 1.4 parts of a mercaptan having six to sixteen carbon atoms per molecule, each being parts by weight and the latter being per 100 parts of said monomeric material.

2. The process of claim 1 in which said dihydroxy benzene is a catechol.

3. The process of claim 1 in which said dihydroxy benzene is tertiary butyl catechol.

4. The process of claim 1 in which said dihydroxy benzene is hydroquinone.

5. In a process of polymerizing by addition polymerization an ethylenically unsaturated polymerizable organic compound to form a high molecular weight linear polymer, the improvement which comprises polymerizing said unsaturated organic compound in aqueous dispersion in the presence of a dihydroxy aromatic compound selected from the class consisting of ortho and para dihydroxy aromatic compounds having the formula $$R_2Ar(OH)_2$$

where Ar is an aromatic nucleus of the group consisting of benzene and naphthalene nuclei, each R is a radical of the group consisting of hydrogen, alkyl, cycloalkyl, aryl, and aralkyl, each having not more than seven carbon atoms with the sum of the carbon atoms in $R_2$ being not greater than seven, together with a diazo thioether having the structural formula $$R-N=N-S-R'$$

where R is an aromatic radical and R' is selected from the group consisting of aromatic, cycloalkyl, and aliphatic radicals, a water-soluble ferricyanide, and a mercaptan having from four to twenty carbon atoms per molecule.

6. The process of claim 5 in which said dihydroxy benzene is a catechol.

7. The process of claim 5 in which said dihydroxy benzene is hydroquinone.

8. The process of claim 5 in which the amount of said dihydroxy aromatic compound is between about 10 and about 100 parts per million parts of said monomeric material, the amount of said diazo thioether is between about 0.05 to about 1 part, of said ferricyanide is between about 0.03 to about 1 part, and of said mercaptan being between about 0.05 and 1.4 parts, each being parts by weight and the latter being per 100 parts of said monomeric material.

9. In the production of a polymeric material of high molecular weight by the polymerization in an aqueous emulsion of a monomeric material comprising a 1,3-diolefin and an unsaturated compound copolymerizable therewith in aqueous emulsion, the improvement which comprises effecting said polymerization in the presence of a composition comprising a dihydroxy benzene in an amount between about 10 and about 100 parts per million parts of said monomeric material together with about 0.05 to about 1 part of a diazo thioether having the structural formula $$R-N=N-S-R'$$

where R is an aromatic radical and R' is selected from the group consisting of aromatic, cycloalkyl, and aliphatic radicals, about 0.03 to about 1 part of a ferricyanide, and between about 0.05 and about 1.4 parts of a mercaptan having six to sixteen carbon atoms per molecule, each being parts by weight and the latter being per 100 parts of said monomeric material.

10. The process of claim 9 in which said dihydroxy benzene is catechol.

11. The process of claim 9 in which said dihydroxy benzene is tertiary butyl catechol.

12. The process of claim 9 in which said dihydroxy benzene is hydroquinone.

13. In a process for producing a synthetic rubber by copolymerizing in aqueous emulsion a monomeric material comprising a major amount of 1,3-butadiene and a minor amount of styrene, the improvement which comprises effecting said polymerization at a temperature between —30 and 70° C. in the presence of a composition comprising 0.1 to 0.5 part of 2-(p-methoxybenzene diazo mercapto)-naphthalene, 0.25 to 0.35 part of potassium ferricyanide, 0.1 to 0.45 part of an alkyl mercaptan having twelve to sixteen inclusive carbon atoms per molecule, all being parts by weight per 100 parts of monomeric material, and 10 to 75 parts per million parts of monomeric material of tertiary butyl catechol, and with the ratio of aqueous medium to monomeric material between 1.5:1 and 2.75:1 by weight.

14. In a process for producing a synthetic rubber by copolymerizing in aqueous emulsion a monomeric material comprising a major amount of 1,3-butadiene and a minor amount of styrene, the improvement which comprises effecting said polymerization in the presence of a composition comprising 0.05 to 1 part of a benzene diazo-mercapto-naphthalene, 0.03 to 1 part of potassium ferricyanide, 0.05 to 1.4 parts of an alkyl mercaptan having four to twenty inclusive carbon atoms per molecule, all being parts by weight per 100 parts of monomeric material, and 10 to 100 parts per million parts of monomeric material of a catechol.

JAMES E. TROYAN.

REFERENCES CITED

The following references are of record in the file of this patent:

UNITED STATES PATENTS

| Number | Name | Date |
|---|---|---|
| 2,362,052 | Craig | Nov. 7, 1944 |
| 2,394,756 | Driesbach | Feb. 12, 1946 |
| 2,402,113 | Hatch | June 11, 1946 |